June 2, 1925.
H. P. HANSON
CATTLE STANCHION
Filed Sept. 4, 1924
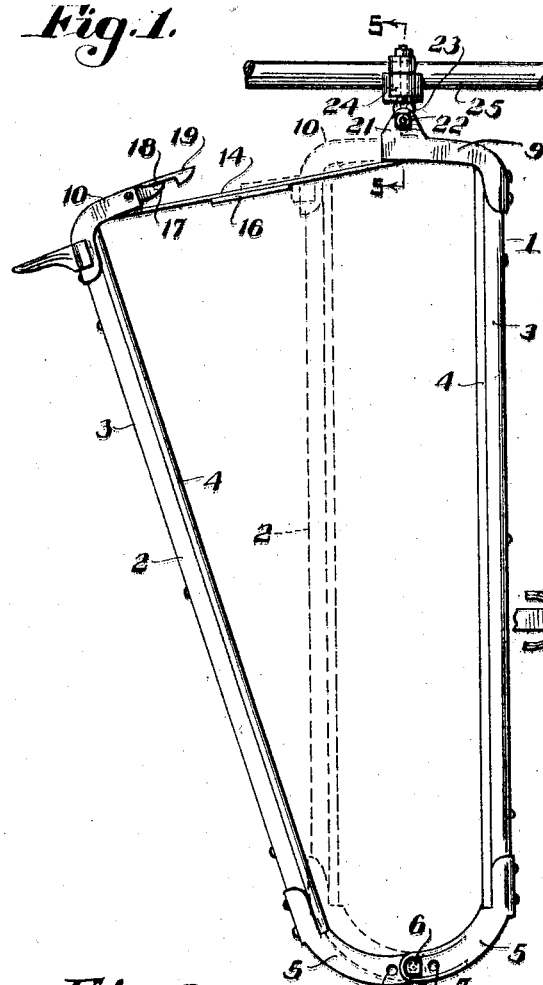
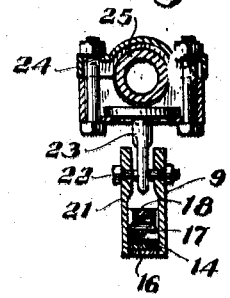
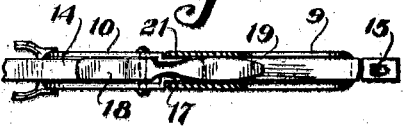
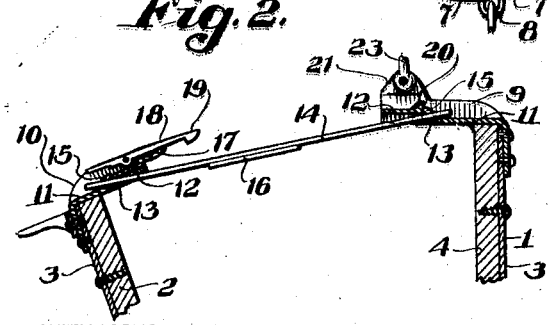
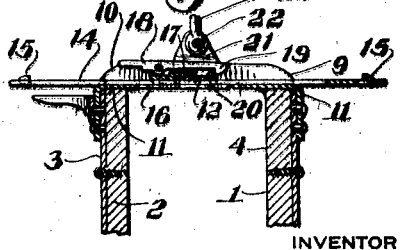
INVENTOR
Haaken P. Hanson
BY
ATTORNEY

Patented June 2, 1925.

1,540,620

UNITED STATES PATENT OFFICE.

HAAKEN P. HANSON, OF ALBERT LEA, MINNESOTA, ASSIGNOR TO THE OLSON MANUFACTURING CO., OF ALBERT LEA, MINNESOTA, A CORPORATION OF MINNESOTA.

CATTLE STANCHION.

Application filed September 4, 1924. Serial No. 735,855.

*To all whom it may concern:*

Be it known that I, HAAKEN P. HANSON, a citizen of the United States, residing at Albert Lea, in the county of Freeborn and State of Minnesota, have invented a new and useful Improvement in Cattle Stanchions, of which the following is a specification.

This invention relates to cattle stanchions.

The object is to improve the construction of stanchions by the provision of simple means incorporated in the upper ends of the side bars of the stanchion whereby the latter, when closed on the neck of the animal, may rotate about a vertical, longitudinal axis, and whereby one of the side bars may be swung outwardly on a pivot at the lower end thereof, to free the head of the animal or permit entrance of the same, the said means limiting the outward movement of the bar and supporting the same when in open position.

In carrying out the invention I provide a slide bar mounted in the upper elbows or heads of the side bars, said slide bar having stops at each terminal to arrest the opening movement of the stanchion, and which, when the latter is closed, will automatically center itself in the said heads, so that the projecting ends of the bar will be equal on either side of the stanchion, the members of which are automatically locked together by means independent of the slide bar.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a front elevation of a cattle stanchion constructed in accordance with the invention, the movable stanchion bar being shown open in full lines and closed in dotted lines;

Figure 2 is a vertical, longitudinal sectional view through the upper end of the stanchion, the bars being in open position;

Figure 3 is a similar view, the bars being closed;

Figure 4 is a plan view of the same;

Figure 5 is a detail section taken on the line 5—5 of Figure 1.

The cattle stanchion herein shown and described is, in the main features, of a well-known type in common use on large stock or dairy farms where cleanliness, care and comfort of the animals are of prime importance, the normally vertical and substantially parallel side bars comprising the stanchion, when closed about the neck of an animal, being so secured and supported in position, as to readily yield to the movement of the animal and thus eliminate all cause for irritation, and at the same time to hold the animal in proper position in the stall whether standing up or lying down.

The present improvements are more particularly concerned with the means for arresting the opening movement of the bars comprising the stanchion, so as to provide for the maximum opening of the same through the swinging action of one of the side bars while the other remains in its normal position, the said means automatically stopping the movable side bar and at the same time permitting the same to be swung upwardly to confine the animal or release the same, and to be automatically latched in closed position. The means for accomplishing this purpose forms a permanent part of the structure, and offers no obstructions or projecting parts to contact with or annoy the animal, and when the stanchion is closed, the said means is automatically centered with respect to the two stanchion bars so that the terminals thereof are equally projected at either side of the stanchion and thus minimize the possibility of interfering with the movements of the animal or with the duties of an attendant.

Referring to the drawing, the stanchion bars are designated 1 and 2 respectively, the bar 1 being substantially stationary, while the bar 2 is adapted to be swung upward and away from the bar 1 at the upper ends. Each bar is composed of a channel iron 3 having a longitudinally disposed wooden filler 4, the fillers 4 being, as is customary, adapted to contact with the neck of an animal.

At their lower ends, each bar 1 and 2 is provided with an inwardly directed elbow 5 in the form of a suitable casting having a suitable flange for attaching the same to the channel irons 3, and the terminal of one elbow interfitting between the terminal of the other, and having suitable alined apertures for a pivot bolt 6, which permits the movable member to be swung from the closed position, shown in dotted lines in Figure 1 of the drawing, to the position indicated in full lines therein, which is the maximum open position. In order to adapt the lower end of the stanchion to animals having smaller necks, a series of perforations 7 are provided in the terminals of the lower elbows, in which the pivot bolt 6 may be inserted in an obvious manner, and a flexible anchoring means in the form of two or three chain links 8 are preferably utilized for limiting the movement of the lower end of the stanchion.

The upper ends of the bars 1 and 2 are likewise fitted into inwardly directed elbows 9 and 10 respectively, each of which is in the form of a channel open at the top and having at their outer ends a bottom wall 11 resting upon the top ends of the fillers 4, and each upper elbow is also provided with an elevated, horizontal wall 12 located within the channels and extending to the inner ends thereof. Between the outer walls 11 and the higher, inner walls 12, there is provided a passageway 13, the outer ends of said walls 12 constituting abutments, and the space between the respective walls 11 and 12 providing a straight passageway therethrough when the two stanchion bars are in closed position.

A straight, flat metal slide bar 14 is adapted to occupy such space when the members are closed and to extend, at such time, slightly beyond the outer sides of the same, as shown in Figure 3 of the drawing. The bar 14 constitutes a slidable stop bar to limit the outward movement of the stanchion bar 2, and for this purpose is provided adjacent to the ends thereof with upstanding lugs 15, preferably formed by striking up the metal, as shown in said figure. The lugs 15 engage with the outer ends of the abutment walls 12 when the stanchion is open, as shown in Fig. 2, and said slide bar then occupies an angular relation to the two elbows 9 and 10, the passageways 13 readily permitting such angular relation by reason of the wall 12 being arranged above the wall 11 in each elbow.

The slide bar 14 is provided, on its under side, with a plate 16, welded or otherwise secured thereto, the ends of which constitute shoulders, one of which ends is adapted to be encountered by the inner edge of the wall 11 of the movable member or bar 2, which engagement causes the said bar to slide through the passage 13 of the stationary stanchion member 1, until the opposite end or shoulder of the plate 16 encounters the inner edge of the wall 11 of the latter member, when the two members are closed and the inner ends of the elbows 9 and 10 are abutting, thus causing the slide bar 14 to project equally at each side of the stanchion. (Fig. 3).

The wall 12 of the movable member 2 is provided at its inner end with an inwardly projecting extension or finger 17, elevated above the same and therefore in position to ride over the opposite wall 12 of the stationary member when the two are closed. Pivotally mounted above the finger 17 is a gravity latch 18, the pivot of which has bearing in the side walls of the elbow 10 and the inner engaging end of the gravity latch is provided with a depending tooth 19, which is adapted to automatically lock over an upstanding lug 20 formed at the outer end of the opposite wall 12 of the stationary member, to rigidly lock the two members of the stanchion together, as shown in Figure 3.

The elbow 9 of the stationary member 1 is provided with upstanding ears 21 for the reception of a pin 22, which connects the stanchion to the depending link 23, swivelled in a well-known manner to a clamp 24, which is connected to a bar 25 located over the same and constituting part of a well-known arrangement in common use.

From the foregoing it will be seen that simple and inexpensive means have been provided in cattle stanchions of this character, which serve to limit the outward or opening movement of the swinging stanchion bar or member, and that the self-centering features thereof are especially advantageous in permitting the maximum amount of space around both sides of the neck and head of the animal to allow room for the attendant.

A special advantageous feature of this device is the fact that the slide bar is not attached to either of the side bars of the stanchion nor to the suspension means but is slidable through both side bars, and when the stanchion is closed, the projection of the slide bar is equal on both sides. It not only limits the opening of the stanchion, but gives support to the lower hinge in strengthening the stanchion when open.

What is claimed is:

1. A stanchion comprising a relatively fixed side bar, a swingable side bar, an elongated slide bar passing loosely through the upper ends of the side bars and projectible beyond the same, means for centering the slide bar so that it projects equally at each side of the stanchion when closed, abutments formed in each side bar adjacent to the slide bar, and lugs carried by the latter and adapted to engage the abutments to support the swingable side bar when fully opened.

2. A stanchion comprising a relatively fixed side bar, a swingable side bar, an elongated slide bar passing loosely through the upper ends of the side bars and projectible at opposite ends beyond the same, abutments formed in each side bar adjacent to the slide bar, and lugs carried by the latter at each end and adapted to engage the abutments to support the swingable side bars when fully opened, co-acting latch members carried by the opposite upper ends of the side bars above the slide bar and adapted to automatically lock the same together when closed, said slide bar acting as a guide to direct the latch members together, and projecting equally on both sides of the stanchion when the latter is closed.

3. A stanchion comprising a relatively fixed side bar, a laterally swingable side bar, said side bars having at their upper ends longitudinal channels formed of a horizontal bottom wall, an elevated horizontal wall, and a horizontal passageway between said walls open at both ends, a latch mounted above the elevated wall of the swingable side bar and carried thereby, a lug coacting with said latch provided on the elevated wall of the fixed side bar, and a substantially straight flat metal slide bar slidably mounted in said passageway and projectible through the same at each end beyond the said side bars when the stanchion is closed, said slide bar being provided with lugs at its ends adapted to engage the elevated wall when the stanchion is open so as to limit the opening thereof.

4. A cattle stanchion comprising a pair of side bars, means for hingedly connecting the bars to permit the swinging movement of one of the bars with reference to the other bar, coacting gravity latch members carried by the upper ends of said bars to automatically lock the side bars together when the swingable bar is closed, a slide bar having terminal lugs, abutments formed on the side bars at their upper ends engaging said lugs to support the swingable bar when the latter is open, and means to center the slide bar so that it is caused to project equally on both sides of the stanchion when the latter is closed.

5. A cattle stanchion comprising a pair of side bars, means for hingedly connecting the bars to permit the swinging movement of one of the bars with reference to the other bar, co-acting gravity latch members carried by the upper ends of said bars to automatically lock the side bars together when the swingable bar is closed, a slide bar having terminal lugs, abutments formed on the side bars at their upper ends engaging said lugs to support the swingable bar when the latter is open, and a central plate or enlargement provided on the underside of the slide bar to engage the side bars and center the slide bar when the stanchion is closed.

In testimony, that I claim the foregoing as my own, I have hereunto affixed my signature.

HAAKEN P. HANSON.